Dec. 23, 1958

J. GARDBERG 2,865,997

DISTORTION SIGNAL GENERATOR

Filed Dec. 22, 1955

6 Sheets-Sheet 1

FIG. I

INVENTOR
JOSEPH GARDBERG

BY Emery Robinson
ATTORNEY

Dec. 23, 1958 J. GARDBERG 2,865,997

DISTORTION SIGNAL GENERATOR

Filed Dec. 22, 1955

6 Sheets-Sheet 2

INVENTOR
JOSEPH GARDBERG

BY Emery Robinson
ATTORNEY

Dec. 23, 1958 J. GARDBERG 2,865,997

DISTORTION SIGNAL GENERATOR

Filed Dec. 22, 1955

6 Sheets-Sheet 3

INVENTOR
JOSEPH GARDBERG

BY

ATTORNEY

Dec. 23, 1958

J. GARDBERG 2,865,997

DISTORTION SIGNAL GENERATOR

Filed Dec. 22, 1955

6 Sheets-Sheet 4

INVENTOR
JOSEPH GARDBERG

BY Emery Robinson

ATTORNEY

Dec. 23, 1958

J. GARDBERG 2,865,997

DISTORTION SIGNAL GENERATOR

Filed Dec. 22, 1955

6 Sheets-Sheet 5

INVENTOR
JOSEPH GARDBERG

BY Emery Robinson
ATTORNEY

Dec. 23, 1958

J. GARDBERG 2,865,997

DISTORTION SIGNAL GENERATOR

Filed Dec. 22, 1955

6 Sheets-Sheet 6

INVENTOR
JOSEPH GARDBERG

BY Emery Robinson
ATTORNEY

United States Patent Office 2,865,997

Patented Dec. 23, 1958

2,865,997

DISTORTION SIGNAL GENERATOR

Joseph Gardberg, Chicago, Ill., assignor to Teletype Corporation, Chicago, Ill., a corporation of Delaware Application December 22, 1955, Serial No. 554,736

21 Claims. (Cl. 178—69)

Figure 1:
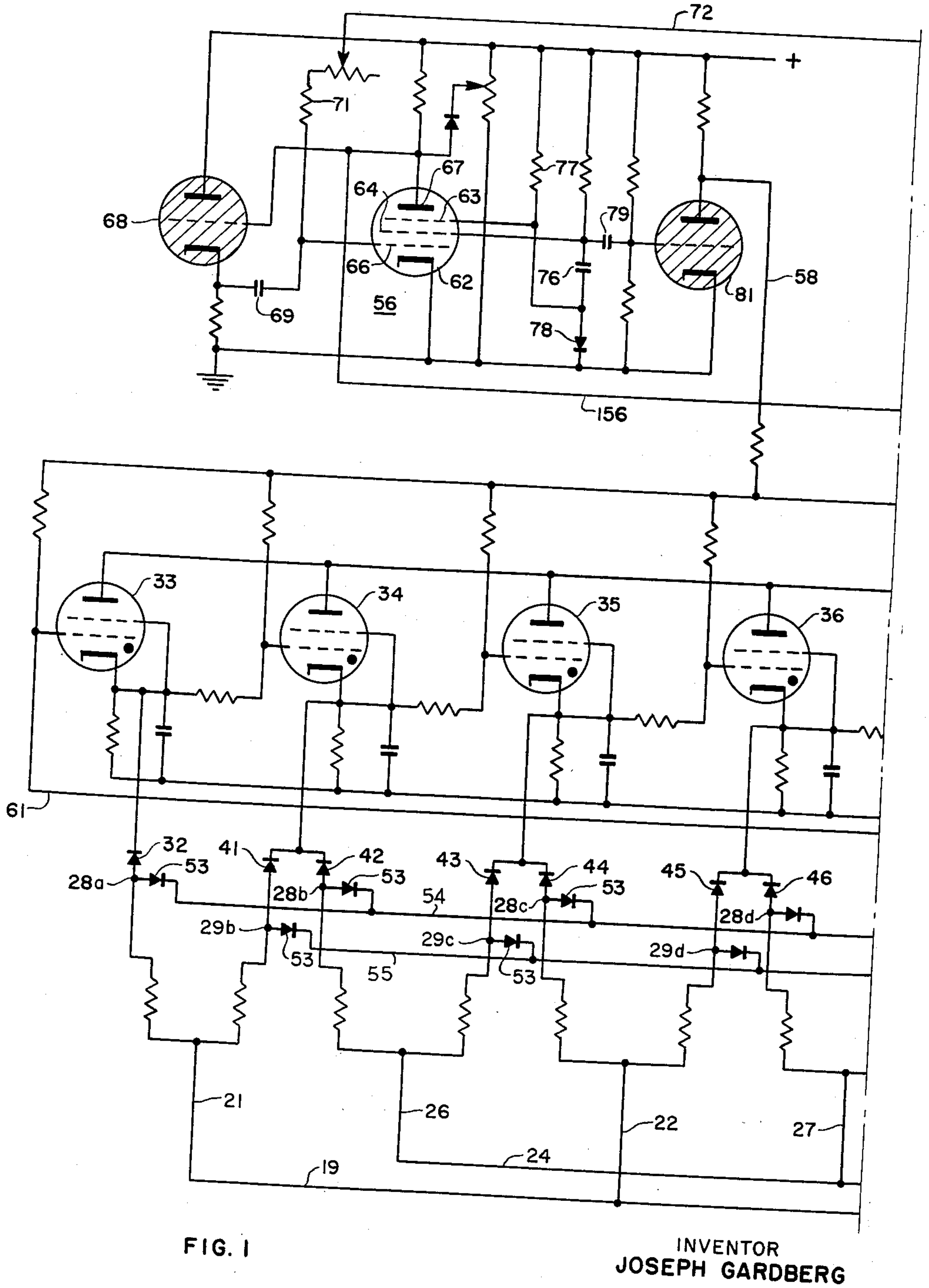

This invention relates to distortion signal generators and more particularly to electronically controlled signal generators having facilities therein to selectively introduce a predetermined type of distortion into each generated signal impulse.

In the actual operation of various telegraph communication systems utilizing well known start-stop permutation code signals, the individual impulses are often distorted. This distortion may be introduced into the signals at many places such as in the signal originating apparatus or in the switching and repeating apparatus or in the transmission circuit itself. Distortion resulting from some inherent characteristic in the apparatus or transmission circuit is usually of constant repetitive character, however, it is possible to attain distortion of a single impulse or a series of impulses. In order to obtain the proper operation of the system it is necessary to design each component apparatus so as to tolerate a certain amount of distortion, otherwise the transmission and recordation of spurious signals will occur.

In a theoretically perfect transmission system each and every signal impulse would be of equal duration and would be either a marking (current) or spacing (no current) character. Distortion of the signals manifests itself in a number of ways to either increase or decrease the duration of the marking impulses. In the present description four types of distortion will be referred to; namely, marking bias, spacing bias, marking end distortion and spacing end distortion. Bias of both types frequently occurs in telegraph transmission and is evidenced in the case of marking bias in an advancement of the space to mark transition with respect to the beginning of the start impulse whereas spacing bias is characterized by a retardation of the space to mark transition with respect to the beginning of the start impulse. End distortion of both types often varies with each signal impulse but it may be encountered in a series of successive impulses. End distortion of the marking type is evidenced by a delay of the mark to space transition with respect to the mark to space transition occurring in the beginning of the generation of the start impulse. Like spacing bias, spacing end distortion results in a decrease in the length of the marking impulses, since it occurs whenever there is a shortening of the interval in which the mark to space transition occurs with relation to the mark to space transition accompanying the initiation of the generation of the start impulse.

The lengthening or shortening of the transition times of each signal impulse results in a departure from the desired unity relation of the marking and spacing impulses and often interferes with the proper reception and recordation of the signals. Designers of present day telegraph apparatus appreciate this problem and carefully design component apparatus to tolerate a certain amount of distortion. In properly designed apparatus distortion in the vicinity of 40% marking or spacing may be accommodated and not interfere with the normal operation. In order to insure that the apparatus functions properly upon receipt of distorted signals, it is necessary that frequent checks be made of the various apparatus both at the time of initial manufacture and also periodically after installation has been accomplished to ascertain if these apparatuses can in fact properly function upon receipt of distorted signals.

It is a primary object of this invention to provide an improved electronic signal generator for producing signals having preselected amounts of distortion introduced into each signal impulse.

Another object of the invention is to produce a distortion signal generator wherein the amount of distortion introduced into each signal impulse is controlled by the period in which an oscillator executes a single cycle of operation.

A further object of the invention is the provision of means for selectively varying the circuit parameters of an oscillator to accordingly vary the character and amount of distortion introduced into each generated signal impulse.

An additional object of the invention resides in a distortion signal generator having facilities therein to preascertain the character of a signal impulse prior to transmission and to utilize this information to control the actuation of an oscillator that determines the amount and type of distortion to be introduced into a generated signal.

A more finite object of the invention resides in a signal generator for introducing bias distortion into marking signal impulses by triggering an oscillator into operation, whereby the forward space to mark transition of a signal impulse is determined by the duration of a single cycle of operation.

Commensurate with the last object it is still another object of the invention to provide a signal generator for introducing end distortion into a marking signal impulse by triggering an oscillator into operation whereby the rear mark to space transition of a marking signal impulse is determined by the duration of a single cycle of operation of the oscillator.

In concordance with the other objects it is an additional object of the invention to provide a signal generator having a multistage start-stop distributor for actuating a series of gating circuits that are adapted to actuate components which function to determine the mark to space and space to mark transitions of each generated distorted signal impulse.

With these and other objects in view the present invention contemplates a multistage start-stop distributor wherein each stage is adapted to control a pair of gating circuits. A first gating circuit of each pair is conditioned by the signal conditions indicative of the signal impulses to be transmitted. The other or second gating circuit in each pair is conditioned by the signal conditions representative of the signal impulses to be next transmitted.

When it is desired to transmit signals having a bias type distortion the successive operation of the stages of the distributor will effectuate operation of the associated pairs of gating circuits in accordance with the representative signal conditions impressed thereon. Whenever a second gating circuit is operated, following non-operation of the preceding second gating circuit, a pulse is generated to immediately trigger an oscillator into a single cycle of operation. Upon completion of this cycle of operation the oscillator actuates a device to generate a pulse that is applied to a binary circuit which thereupon effects a transition from a spacing to marking condition on an output line. When the next stage of the distributor is operated and a marking condition is impressed on the first gating circuit associated with this stage, a marking condition is applied to a control lead. Now, if the next succeeding signal condition to be transmitted is indicative of a space impulse then the next succeeding first gating circuit, when operated, will impress a spacing condition on the control lead. A differentiating circuit responds to a transition from a marking to spacing condition on the control lead to effect an operation of the binary circuit therefore causing another transition to occur on the output lead which terminates the duration of the marking impulse impressed thereon.

It may be thus appreciated that the duration of the marking impulse is fixed between the time at which the cycle of operation of the oscillator is completed and the time that the next succeeding stage of the distributor is operated in conjunction with an associated first gating circuit having a spacing condition applied thereto. From this it may be readily understood that marking and spacing bias may be selectively introduced into signals by merely changing a period of the cycle of operation of the oscillator. For marking bias it is only necessary to select circuit parameters for the oscillator which will give it a relatively short cycle of operation and conversely for spacing bias it is only necessary to select circuit parameters which give the oscillator a relatively long cycle of operation.

When it is desired to impart marking and spacing end distortion to signal impulses the heretofore discussed circuits are employed but in this instance the first gating circuits are utilized to control the generation of each space to mark transition and the oscillator controls the duration of the marking condition. By adjusting the circuit parameters associated with the oscillator so that the oscillator executes a relatively short cycle of operation a mark to space transition is impressed on the output lead in a relatively short time and the signals thereby generated are characterized by spacing end distortion. Similarly if the circuit parameters are adjusted to give the oscillator a relatively long cycle of operation then signals are generated having marking end distortion.

Figure 2:
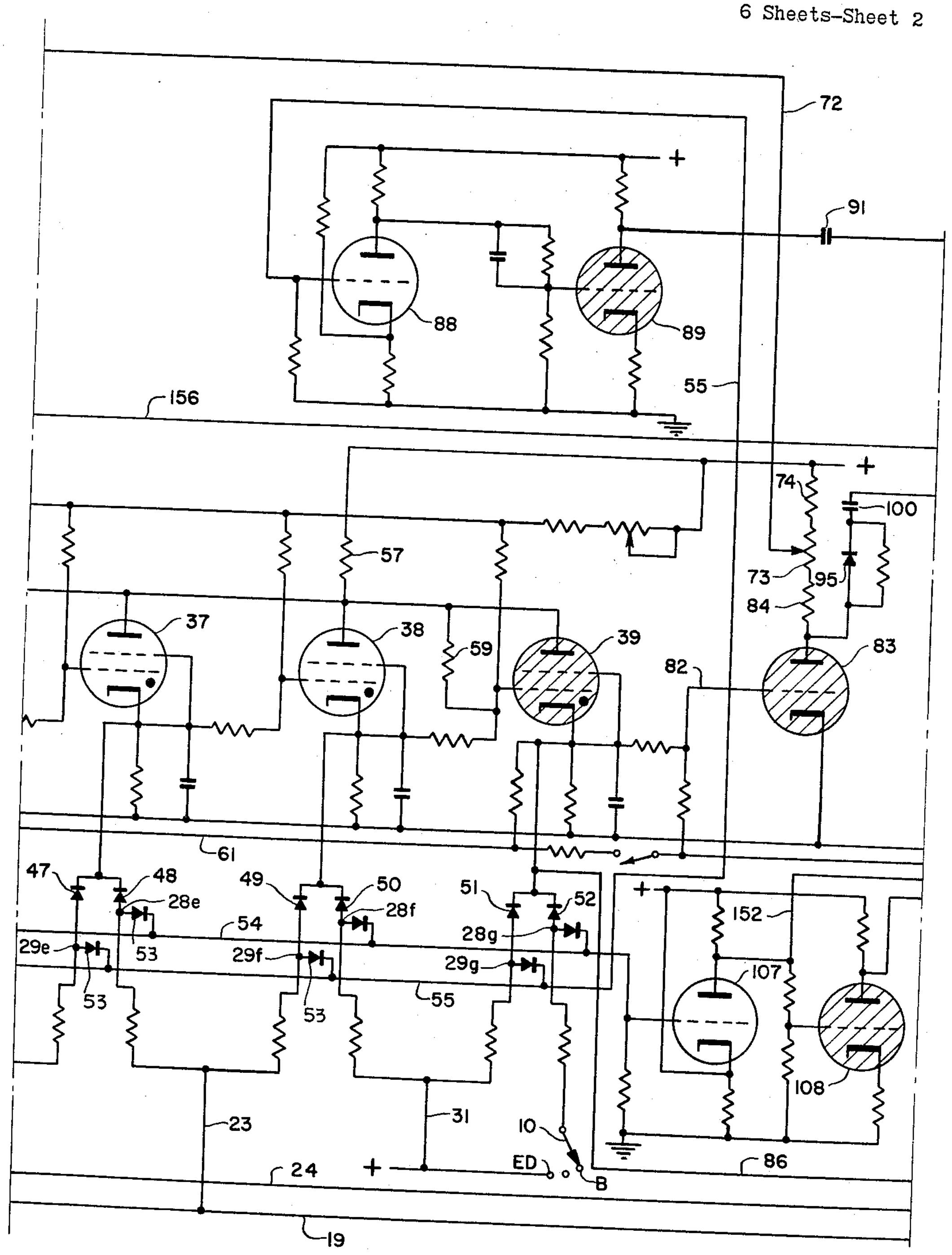
Figure 3:
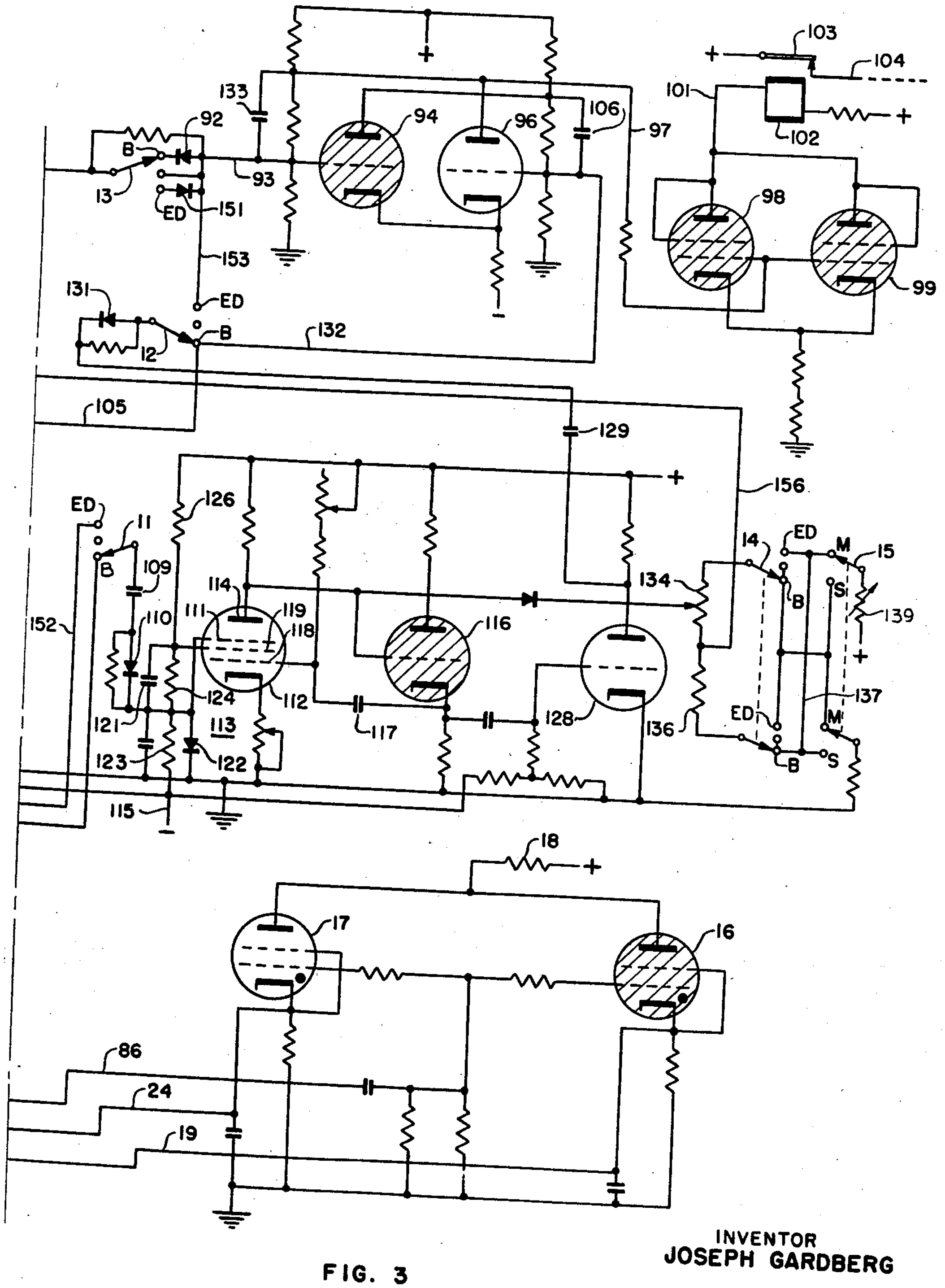
Figure 5:
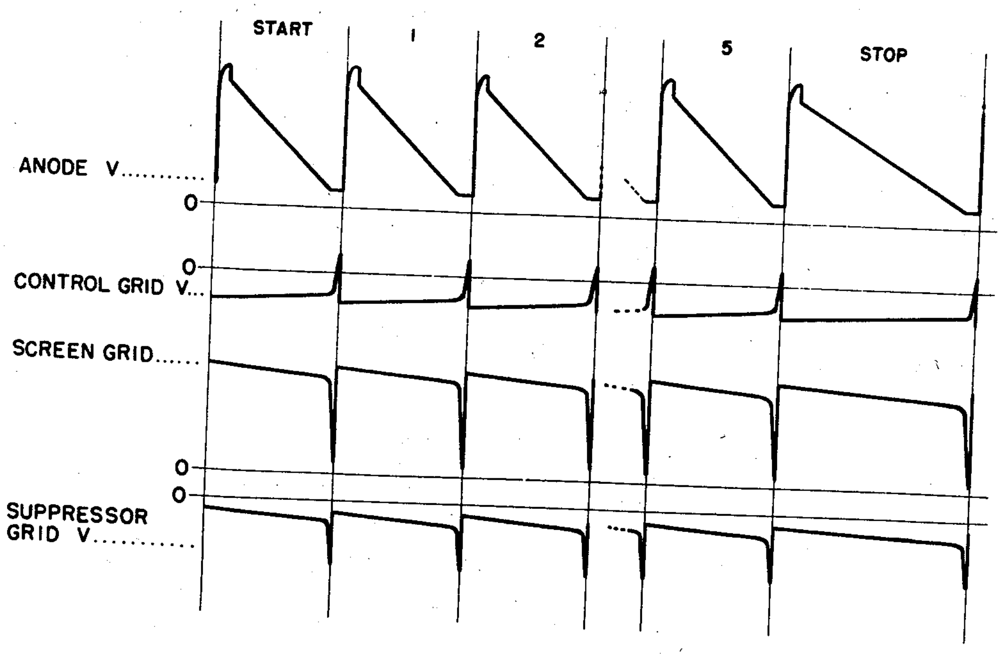
Figure 4:
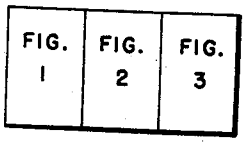

Other objects and advantages of the present invention will be apparent from the following detailed description when considered in conjunction with the accompanying drawings wherein:

Figs. 1, 2 and 3, when assembled in the manner instructed in Fig. 4, disclose a circuit diagram of a signal generator for introducing distortion into telegraph signals in accordance with the principal features of the invention;

Fig. 5 is a timing diagram showing potential conditions existing on various components of a phantastron oscillator during a cycle of operation; and Figs. 6, 7, 8 and 9 are timing diagrams showing potential conditions existing on various components of the circuit shown in Figs. 1, 2 and 3 during the time that the signals are being generated and transmitted.

It is believed that the construction of the individual components may be readily comprehended by a detailed description of the operation of the circuit. When it is desired to utilize the circuit shown in Figs. 1, 2 and 3 to generate and transmit signals having each and every generated signal impulse characterized with a marking bias, the signal generator is first conditioned by setting a number of switches 10, 11, 12, 13 and 14 on the bias contacts B in the manner illustrated in the drawings. It is to be readily comprehended that all of these switches could be connected together to be operated by a single switch actuator. Further, a double contact switch 15 (see Fig. 3) is moved to its mark position M.

With these preparatory operations completed, the signal generator is now in condition to generate signals having marking bias. In the lower left-hand corner of Fig. 3 there is depicted a source of signals which in this instance is a bistable multivibrator or binary having two thyratron tubes 16 and 17. Other types of apparatus for controlling the initial generation of the signals could be utilized with equal facility; for instance, the present circuit could be used with a tape reader, a series of cams having projections thereon indicative of signal conditions, or any other mechanical or electric means for producing permutations of potential conditions. Tubes 16 and 17 each have a resistance-capacitance network connected in their cathode circuits, further, each of these tubes is connected through a common resistance 18 to a source of potential so that whenever one of said tubes is rendered conducting the other tube is rendered nonconducting.

The cathode of tube 16 is connected over a lead 19 to a series of leads 21, 22 and 23, whereas the cathode of tube 17 is connected over a lead 24 to a pair of leads 26 and 27. When tube 16 is rendered conducting, its cathode potential rises to impress an increased potential over the lead 19 to the leads 21, 22 and 23, which potential condition is indicative of a signal representative of the letter R. When tube 17 is operated, the potential on leads 26 and 27 is raised and this condition is representative of the signal Y. Assuming that the tube 16 has operated, there is a rise in potential which is impressed over the leads 21, 22 and 23, through dividing circuits to condition a set of junction points 28a, 28c, 28e and 29b, 29d, 29f. A lead 31 (Fig. 2) connects positive battery through a pair of circuits to junction points 28f and 29g. If tube 17 is operated then the potential is raised on leads 26 and 27 to raise the potential at junction points 28b, 29c, 28d and 29e. Inasmuch as the switch 10 is not connected to any source of potential, the junction point 28g remains at zero value.

For purposes of illustration assume that it is desired that the first signal to be transmitted is an R signal. Then, the tube 16 will be operated and the leads 21, 23 and 25 will impress increased potential on the associated junction points. Junction point 28a is further controlled through a diode 32 by the potential existing on the cathode of a tube 33. Tube 33 and tubes 34, 35, 36, 37, 38 and 39 are of the thyratron type and are interconnected to comprise a start-stop signal distributor. Tube 34 has its cathode connected through diodes 41 and 42 to further control the potential applied to the junction points 29b and 28b. In a like manner the cathodes of tubes 35, 36, 37, 38 and 39 control the other junction points 28 and 29 through the diodes 43, 44, 45, 46, 47, 48, 49, 50, 51 and 52. Whenever (1) the potential is raised on a lead running to a junction point 28 or 29 and (2) the associated diode 32 or 41 to 52, inclusive, running to the cathode of any of the tubes 33 to 39, inclusive, is rendered conducting, then the potential of the junction point will be sufficiently raised to render a gating diode 53, conductive to raise the potential impressed on either a lead 54 or 55. It may be appreciated that circuit elements connected to the junction points 28 and 29 form a series of gating circuits which may be conditioned for operation by the potential impressed on leads 21, 22, 23, 26, 27 and 31 and successively operated by the successive operation of the distributor tubes 33 to 39.

The start-stop distributor for sequentially operating the conditioned diode gates comprises the tubes 33 to 39. Each of these tubes has its cathode connected to a control grid of the next succeeding grid to form a closed ring. The anode of each tube is connected through a common resistance 57 to a source of positive potential. In addition the control grid of each tube is connected to a common lead 58 over which are applied positive operating pulses for successively stepping along the conductive stage of the distributor.

When positive battery is initially applied to the distributor, a coupling including a resistance 59 running from the anode of tube 39 to the grid of this tube favors conduction of this tube and will cause this tube to be initially rendered conductive. With tube 39 in its conductive state its cathode potential rises to impress an increased potential condition through a coupling lead 61 to the control grid of the tube 33. Appearance of a positive going operating pulse on the lead 58 is impressed upon the control grids of all the tubes but inasmuch as the control grid 33 is already at an elevated state, the further increase in potential on the grid of this tube will render the tube conducting. Inasmuch as the cathode circuit of each tube includes a capacitance network the potential on the cathode of tube 39 will be held at an elevated state whereas the potential on cathode of tube 33 will be held at a relatively low state. Further, since both tubes 33 and 39 are conducting for an instant the anode potentials of both will drop until such time as the potential difference between the anode and cathode of tube 39 is no longer sufficient to sustain conduction through this tube, whereupon the tube 33 will become the only conductive tube in the distributor. In a like manner the other tubes may be successively operated upon the appearance of subsequent operating pulses on lead 58.

Positive pulses are impressed on the lead 58 from a phantastron oscillator generally designated by reference numeral 56 and which comprises a pentode 62 having a suppressor grid 63, a screen grid 64 and a control grid 65. This tube also has an anode 67 coupled through a cathode follower tube 68 and a capacitance 69 to the control grid 66. The operating characteristics of the various electrodes of tube 62 are illustrated in Fig. 5. Considering the operation of the phantastron the anode 67 will drop in potential during conduction therethrough until such time as the build up of space charge in the vicinity of the anode precludes any further drop. During the rundown of the anode potential, the drop in the anode potential was applying a negative charge to the condenser 69 to hold the control grid 66 negative. The inability to supply additional negative charges to the condenser 69 permits the grid 66 to rise in potential due to a connection of the grid running through resistances 71, over a lead 72, through an adjustable tap on a resistance 73, through a resistance 74 connected to positive battery. The rise in control grid potential permits the screen grid 64 to commence drawing heavy current. Immediately thereupon the potential of the screen grid drops rapidly and applies this drop in potential through a coupling condenser 76 to drive the potential of the suppressor 63 negative considerably beyond the value necessary to cut the anode off. Thereafter the anode potential will rise very rapidly to its maximum positive value carrying with it the potential of the grid 66. This action occurs because the rise in anode potential is impressed on the grid of the tube 68 to drive the tube into a heavy state of conduction causing its cathode potential to rise which rise is impressed through the condenser 69 to the grid 66.

When the screen grid potential drops to its minimum value it can no longer supply negative charges through the condenser 76 and hence the suppressor 63 will start to rise in potential due to the connection of the suppressor through a resistance 77 to the source of positive potential. Suppressor 63 is connected through a diode 78 to ground to prevent an excessive rise in suppressor potential and as the suppressor approaches ground potential, the anode 67 will again start to conduct. The initial rundown of the anode potential is instantaneous and only ceases when the grid 66 is driven sufficiently negative to permit the grid to control the anode current by virtue of reduced screen current and the negative control grid. As the flow of current to the screen 64 is reduced, the potential on the screen grid will rapidly rise. Thereafter the potential of the anode 67 will drop in a linear fashion to hold the control grid 66 at a negative value. The rundown of the anode potential will continue until limited by existing space charge potential of the tube 62 to preclude further drop of the anode thereby precluding the application of further negative charges to the control grid. The phantastron is now in condition to execute another cycle of operation.

Whenever the screen grid drops in potential, a negative charge is impressed through a condenser 79 to render a normally conducting tube 81 nonconducting. Nonconduction of tube 81 is immediately followed by a rise in its anode potential which is impressed over the lead 58 to supply the next positive going pulse to step the start-stop distributor one stage. Inasmuch as the screen grid 64 is only driven negative for an instant the tube 81 is only rendered nonconductive for an instant.

Whenever the tube 39 is rendered conducting in a cycle of operation of the start-stop distributor, the rise in cathode potential of this tube is impressed over a lead 82 to render a tube 83 conductive. The anode of tube 83 is connected through a resistance 84, through the resistance 73 and through the resistance 74 to the source of positive potential. The period of operation of the phantastron 56 may be regulated by controlling the potential applied through the resistances 74, 73 and 71 to the control grid 66. If the positive potential applied through these resistances is decreased then the drop in anode potential of tube 62 need not be at such a fast rate, because there will be less tendency for the condenser 69 to discharge through the circuit including these resistances. When the tube 83 operates, its anode potential drops resulting in a decrease in the value of the positive potential at the tap on resistance 73. In view of the decreased potential available to counteract the effect of the negative charges being supplied to the grid the anode potential will drop at a slower rate and the slope of linear rundown of anode 67 is decreased to give a longer period of operation to the phantastron. This prolonged operation of the phantastron permits the tube 39 to remain conductive for a longer period than any of the other tubes in the distributor and thus provides the means for generating a prolonged stop impulse to accompany each generated start-stop signal.

Whenever the tube 39 is rendered conducting the rise in its cathode potential is also impressed over a lead 86 to a junction point between the grids of the signal originating tubes of the binary 16—17. Appearance of this positive potential on the grids of the tubes 16 and 17 will eventually render the conducting tube nonconductive and the nonconducting tube conducting. This action is the result of the capacitance network connected to the cathode of each of these tubes which will function to hold the cathode of the conducting tube at a relatively high value and the cathode of the nonconducting tube at a low value during the transition time. Recalling that the anodes of these tubes are connected through the common resistance 18 to the source of positive potential then it will be apparent that the anode potential of both tubes will drop whenever a positive potential is applied to the control grids to render these tubes conducting. The conducting tube will remain conducting until such time as the potential difference between its cathode and anode is insufficient to maintain conduction. Thereafter, the previously nonconducting tube is the only tube capable of sustaining conduction.

Assume the stop tube 39 is rendered conducting then the cumulative effect of the potential source connected to lead 31 and the rise in cathode potential of tube 39 causes diode 29g to conduct and to impress an increased potential condition over lead 55. This increased potential renders an amplifier tube 88 conducting. Conduction of tube 88 is accompanied by a drop in its anode potential which drop renders a second normally conducting amplifier tube 89 nonconducting. When the tube 89 is initially rendered nonconducting, the rise in its anode potential is impressed through a differentiating condenser 91 and through the switch 13 whereupon the positive going pulse is blocked by a diode 92 that is connected over a lead 93 and through a voltage divider to a source of higher potential.

Lead 93 is also connected to the grid of a tube 94 that is connected with a tube 96 to form a bistable multivibrator (binary) circuit. During idle periods of the signal generator with the stop tube 39 operating, the tube 94 is conducting and the tube 96 is nonconducting. With the tube 96 in a nonconducting state its anode potential is at a relatively high value to impress an increased potential condition over a lead 97 to the grids of a pair of current amplifier tubes 98 and 99. Tubes 98 and 99 are thus in a state of heavy conduction permitting current to flow through the respective anode circuits, over a common lead 101, through the windings of a line relay 102 to a source of positive battery. Energization of the line relay 102 effectuates a drawing up of a line contact 103 to complete and apply a marking condition on a transmission line circuit 104.

When the tube 39 in the distributor is shut off, and the tube 33 operated, there is no further source of positive potential connected to the lead 55, consequently, the potential on this lead drops to impress a decreased potential on the tube 88 whereupon this tube is rendered nonconducting. Immediately thereupon the anode potential of this tube rises to impress an increased potential on the grid of the tube 89 thereby placing this tube in a conducting state. When tube 89 is rendered conducting, its anode potential drops to impress a decreased potential through the differentiating condenser 91 whereupon a negative going spike is developed and impressed through the switch 13 to the diode 92. The appearance of a negative going potential on the diode 92 renders this diode conductive whereupon the potential on lead 93 drops to cause a like drop on the grid of the tube 94. Tube 94 thereupon ceases conduction and the anode potential thereof rises to impress an increased potential through a coupling condenser 106 to the grid of the nonconducting tube 96 to render the tube 96 conducting. Thereafter the potential of the anode of the now conducting tube 96 drops to reduce the potential applied over lead 97, thus driving the amplifier tubes 98 and 99 into a nonconducting state. The line relay 102 is thereupon deenergized to release the line contact 103 which opens to impress a no current or spacing condition on the output lead 104.

The tube 96 of the binary is also driven toward the conductive state by the action of the tube 83 shutting off when the stop tube 39 is rendered nonconducting. More particularly, nonconduction of tube 83 is accompanied by an immediate rise in its anode potential which is impressed through a diode 95, through a differentiating condenser 100, over a lead 105 over a lead 132 to the grid of tube 96. This arrangement provides a second means for insuring that a spacing condition is impressed on the output line at the start of the transmission of each new signal.

With the tube 33 in the distributor operating and recalling that an increased potential is impressed on lead 21 then the potential on junction point 28*a* rises sufficiently to impress an increased potential on the lead 54. This increased potential on lead 54 renders an amplifier tube 107 (Fig. 2) operative. Following operation of tube 107 its anode potential will drop to impress a decreased potential on the grid of a normally conducting tube 108 to render this tube nonconducting. The accompanying rise in anode potential of tube 108 is impressed through the switch 11 whereafter the rise in potential is impressed through a condenser 109 and through a diode 110 onto a suppressor grid 111 of a pentode 112. Pentode 112 and associated circuits are connected to form another phantastron oscillator generally designated by the reference numeral 113. This phantastron is normally held from operation by a negative potential impressed from a source over a lead 115 connected to the suppressor grid 111. When the suppressor grid 111 is driven to ground by the positive potential pulse impressed through diode 110, an anode 114 of the pentode 112 is permitted to draw current.

Again, as discussed with respect to phantastron 56, anode current flow is accompanied by a drop in anode potential which is utilized to drive a cathode follower tube 116 towards a state of nonconduction. Accompanying this action the potential of the cathode of tube 116 drops to impress a negative potential through a condenser 117 to a control grid 118 of the pentode 112. With the grid 118 having a negative potential applied thereto, current normally flowing to a screen grid 119 is reduced and the potential on the screen grid rapidly rises. As the screen potential rises this rise is impressed through a coupling resistor 124 and condenser 121 to the suppressor grid thereby holding the suppressor potential at ground to permit the anode 114 to continue to draw current. The rise in suppressor potential is limited to a value slightly above ground potential by a diode 122. The suppressor is held at substantially ground potential after the condenser 121 has discharged by the action of a voltage divider consisting of a resistance 123 connected to the source of negative potential and the resistances 124 and 126 connected to the source of positive potential.

As previously described with respect to the phantastron 56 the anode potential of phantastron 113 will initially drop in instantaneous fashion and thereafter continue to drop in linear manner supplying sufficient negative charges to the control grid 118 whereby said control grid precludes the current flow to the screen grid. However, when the anode potential drops to the space charge value to preclude further drop in the potential of the anode 114, the potential on the grid 118 will rise to permit the screen to commence drawing current. Immediately thereupon the screen potential drops and impresses through the coupling capacitance 121 a negative potential to drive the suppressor negative to preclude further flow of anode current. After the condenser 121 has discharged the suppressor is maintained in its negative condition by the negative potential impressed over the lead 115 from the negative source.

While the anode 114 has current flowing therethrough the potential thereof is at a relatively low value and as a result the tube 116 is driven toward a state of nonconduction. The grid of a tube 128 is biased to hold this tube in a state of nonconduction. However, when the pentode 112 is restored to its nonoperative state and the potential on the anode 114 rises, the tube 116 is placed in a state of heavy conduction whereupon its cathode potential rises to impress a rise in potential on the grid of the tube 128. Conduction of tube 128 is followed by a drop in its anode potential which is impressed through a differentiating capacitance 129, through a diode 131, and through the switch 12 to the lead 132. Lead 132 is connected to the grid of the tube 96 and as previously mentioned this tube is now in a conductive state, consequently the appearance of a negative pulse on the grid of this tube results in a cessation of conduction. The potential of the anode of tube 96 thereupon rises to impress an increased potential through a coupling condenser 133 to the grid of the tube 94 thereby placing this tube in a conducting state. The increased potential on the anode of the tube 96 is also impressed over the lead 97 to drive the current amplifiers 98 and 99 towards a state of conduction. This action results in a commencement of flow of the energizing current for the line relay 102. Line relay 102 thereupon draws up its contact 103 to impress a marking condition on the output line 104.

The particular time at which this marking condition is impressed on the output line 104 is determined by the time that it took the phantastron 113 to execute a single cycle of operation. The period in which the phantastron executes a cycle of operation is determined by the initial value of potential on the anode 114. This potential is set by the resistance values of a circuit running from the anode 114 through a diode, through an adjustable tap resistance 134, through a resistance 136, a portion of the switch 14 on the bias contact B, over a lead 137, through the switch 15 on the M contact and through adjustable resistance 139 to the source of positive battery. This resistance circuit is of relatively high value and hence the potential impressed on the anode 114 is at a relatively low value and the period of rundown of the phantastron occurs during a relatively short period. In fact, resistance values are selected so that the rundown of this phantastron occurs in one-half the time that it takes the phantastron 56 to execute a normal cycle of operation. This mode of operation will impart a 50% marking bias to the signal impressed on the output line 104, since the transition from spacing to marking on line 104 occurs half way between the time that the tube 33 comes on and the tube 34 commences conduction.

When the next positive pulse is impressed over the lead 58 to cause the tube 34 to be rendered conducting the potential of junction point 29*b* rises to impress an increased potential over the lead 55 to render the tube 88 conducting. Conduction of tube 88 is followed by non-conduction of tube 89, whereupon the anode potential of this tube rises but due to the diode 92 this rise in potential is not passed therethrough to effect the operation of the binary 94—96. It is to be recalled that the lead 26 (Fig. 1) is at a low potential value hence the rise in potential impressed on the diode 42 by the conduction of the tube 34 is of wrong polarity to raise potential of the junction point 28*b* to render its associated diode 53 conductive, hence the potential on the lead 54 is not raised and the phantastron 113 does not operate. Thus during the period that tube 34 is operating the marking condition is maintained on the output line 104.

When the distributor tube 35 operates it raises the potential impressed on the diode 43 but the potential on lead 26 is at a low value hence the potential on the junction point 29*c* is insufficient to maintain its associated diode 53 conductive consequently there is a drop in potential impressed on lead 55. This drop in potential causes the tube 88 to assume a nonconducting condition whereupon its anode potential rises to cause the tube 89 to commence conduction. Conduction of tube 89 is followed by a drop in its anode potential which is impressed through the differentiating condenser 91 to provide a negative going pulse that is applied to the diode 92 causing this diode to be rendered conducting for an instant. Conduction of diode 92 is accompanied by a drop in potential on lead 93 and the grid of tube 94. Tube 94 is thereupon rendered non-conducting and its anode potential rises to drive tube 96 into a state of conduction. Conduction of tube 96 is followed by a drop in its anode potential which drop is impressed over lead 97 to render the current amplifiers 98 and 99 non-conducting. Obviously non-conduction of tubes 98 and 99 results in a de-energizing of the line relay 102 to cause the line contact 103 to open and thereby impress a spacing condition on the line 104.

As soon as distributor tube 35 operates the potential on diode 44 is raised and since the potential condition on lead 22 is at an elevated condition then the potential of junction point 28*c* is raised sufficiently to impress an increased potential over the lead 54. Each time an increased potential condition is noted on lead 54 the phantastron 113 is caused to execute a cycle of operation. Upon termination of the cycle of operation of this phantastron a negative pulse is applied over lead 132 and the binary circuit 94—96 is actuated to render the tube 96 non-conducting whereupon the current amplifiers 98 and 99 are operated to again apply energizing current to the line relay 102. Energization of the line relay 102 again effectuates the impression of a marking condition on the output lead 104 to start a new biased marking signal impulse.

As each of the other distributor tubes 36, 37, 38 and 39 are operated, a marking impulse is impressed on the output line 104 whenever the junction points 28*d*, *e* and *f* of the associated gating circuits are raised in potential to actuate the phantastron 113. It will be noted that positive battery is always applied to junction point 29*g* and as a result the marking condition is always impressed on the output line prior to and during the time that the tube 39 is operating. Marking impulse is terminated on the output lead 104 whenever a tube of the distributor is operated and the associated junction point 29 is not raised in potential sufficiently to operate the associated diode 53 and maintain the high potential condition on lead 55. The drop in potential on lead 55 is followed by non-conduction of tube 88, conduction of tube 89, non-conduction of tube 94, conduction of tube 96, non-conduction of tubes 98 and 99 and release of the relay 102.

Figure 6:
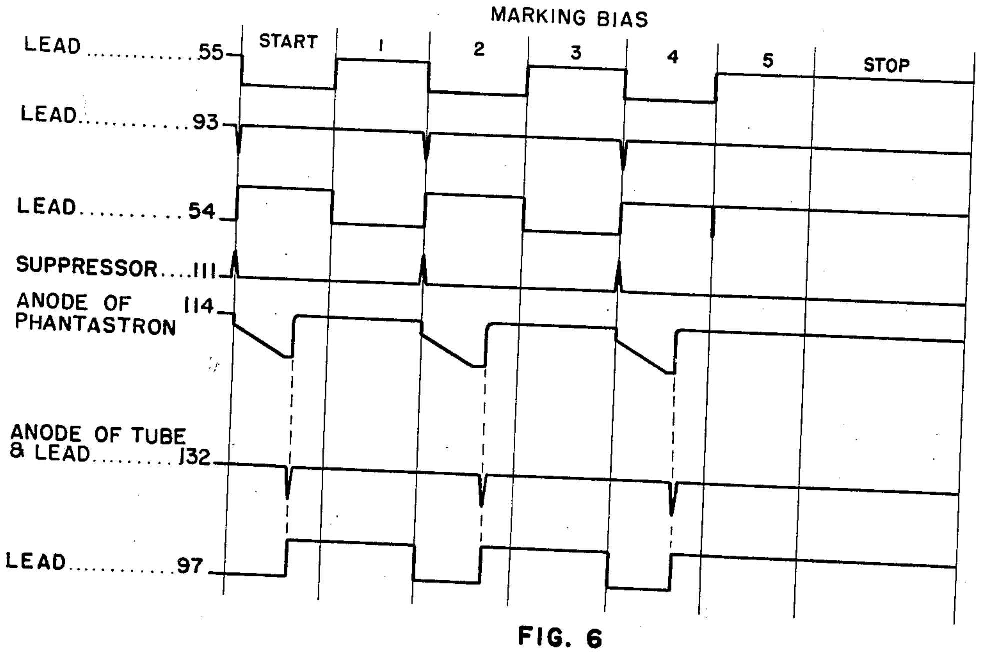

An understanding of the operation of the circuit may be further enhanced by reference to Fig. 6 wherein potential conditions on the various key components are disclosed with respect to the time that it takes to generate a distortion signal having 50% marking bias. The first line 55 represents the potential conditions impressed on lead 55 by the operation of the distributor and is indicative of a perfect signal without any distortion. Line 54 represents the potential conditions impressed on lead 54 and it will be noted that these conditions are the inverse of the potential conditions applied on the lead 55 with the exception that the No. 5 impulse condition is always marking in anticipation of the stop impulse. More particularly when the tube 38 is operated which occurs at the start of the generation of the No. 5 impulse, the junction point 28*f* has an increased potential impressed on the diode 50 and also on the lead 31 which is always connected to positive battery.

Each time a space to mark transition is impressed on lead 54, a positive impulse is generated and impressed through the diode 110 to the suppressor 111 which condition is denoted by line 111. Each of the impulses impressed on suppressor 111 triggers the phantastron 113 into a cycle of operation. Upon completion of each cycle of operation of the phantastron the tube 128 is rendered conducting and its anode potential drops. The condition of anode potential of tube 128 is the same as impressed on lead 132 indicated in Fig. 6 by the wave form denoted anode of tube and lead 132. It may be observed that each time the tube 128 is rendered conducting a negative going pulse is impressed over the lead 132, to render the conductive tube 96 of the binary circuit nonconducting. Each time the tube 96 is rendered non-conducting a space to mark transition is impressed on the lead 97 to render conductive the tubes 98 and 99 to cause a marking transition to occur on the output lead 104. The potential conditions existing on the lead 97 from the binary circuit are illustrated in Fig. 6 by the line designated 97 and it will be appreciated that the conditions impressed on this lead are indicative of potential conditions impressed on the output line 104.

It will be noted that each time a mark to space transition is impressed on the lead 55 (see line 55, Fig. 6) a negative going pulse will be impressed on the lead 93 which operates the binary circuit 94 and 96 to impress a drop in potential on the output binary lead 97. The effect of this action is to terminate the duration of the marking impulse impressed on the output line 104.

It may be understood that the percent of marking bias imparted to each signal may be varied by varying the limiting potential of the anode 114 of the phantastron 113. By moving the adjustable tap on the resistance 134 downwardly less resistance is introduced into the anode circuit and hence the rest position of the anode potential is at a higher initial value and it will take a longer time for the phantastron to execute a single cycle of operation thereby delaying the initial time of the space to mark transition of each generated marking signal impulse.

In order to introduce spacing bias into each generated marking signal it is only necessary to move the switch 15 (see Fig. 3) from its M position to its S position. When this is accomplished the resistance 139 is cut out of the circuit running from the source through the tap of the resistance 134 to the anode 114. Consequently, the anode is maintained in the rest position at a relatively high value and it will take a greater amount of time for the phantastron to execute a cycle of operation.

Figure 7:
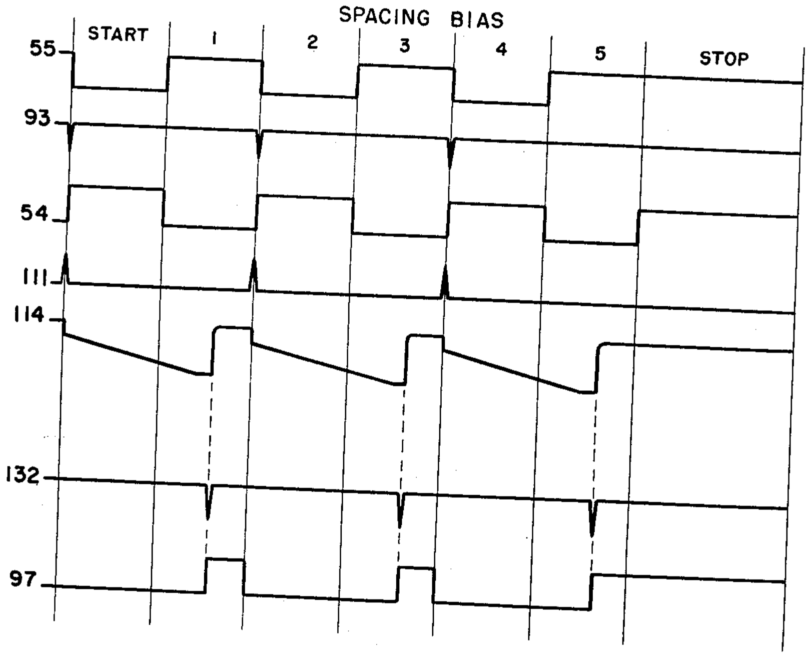

The operating potentials on the various major components, when the circuit is utilized to generate signals having spacing bias, are illustrated in Fig. 7. In this instance the same reference numerals are utilized as in Fig. 6. Again it will be noted that the initiation of the time that a marking impulse is impressed on the lead 97 and thus line 104 is determined by the time that it takes the phantastron 113 to execute a cycle of operation. Each marking impulse is again terminated upon the impression of a mark to space transition on a lead 55. The amount of spacing bias introduced into each signal may be adjusted by varying the adjustable resistance 134 which will accordingly vary the potential impressed on the anode 114 of the pentode 112.

In order to generate signals having end distortion, the operation of the circuit is slightly different in that the space to mark transition on the lead 55 will effectuate a generation of a space to mark transition on the output line 104 and the duration of the marking impulse will be determined by the time it takes the phantastron 113 to execute a single cycle of operation.

In order to operate the signal generator to produce signals characterized by end distortion, the switches 10, 11, 12, 13 and 14 are moved to the positions marked ED in the drawing. In addition the switch 15 (Fig. 3) is moved to its M position for generating signals having marking end distortion. When a cycle of operation is to commence, the stop tube 39 and stop follower tube 83 are shut off and the rise in potential on the anode of tube 83 is impressed through the diode 95 and condenser 100 and over the leads 105 and 132 to render the tube 96 conductive. Conduction of tube 96 is followed by nonconduction of tubes 98 and 99 to release the relay 102 to impress a spacing condition on the line 104 which is representative of the initiation of start impulse. Assume for purposes of illustration that the leads 21, 22 and 23 again have signal conditioning potentials impressed thereon, then when the start tube 33 operates the potential on lead 55 will drop to shut off the tube 88 and render the tube 89 conductive. In this instance the drop in anode potential on tube 89 is passed through the condenser 91 and through the switch 13 but a diode 151 precludes application of this negative going pulse to the grid of the tube 94. Inasmuch as the setting of the binary 94—96 is not disturbed during the operation of the tube 33, a start impulse of full width will be generated to precede the signals having end distortion.

In this instance the operation of tube 33 also causes junction point 28*a* to rise to a sufficient potential value to render the associated diode 53 conducting and as a result an increased potential condition is impressed on the lead 54. This increase in potential effectuates an operation of the tube 107 and the anode potential of this tube drops to lower the potential existing on a lead 152, now connected to the phantastron 113 by the switch 11. However, this drop in potential is ineffective to release the phantastron since it cannot pass through the diode 110.

As soon as the tube 34 operates the junction point 29*b* rises in potential to impress an increased potential over the lead 55 to operate the tube 88 which in turn renders the tube 89 nonconductive. Immediately thereupon the anode potential of tube 89 rises and this rise is impressed through the condenser 91, through the switch 13, through the diode 151, over the lead 93 to render the tube 94 conducting. Tube 96 is thereupon rendered nonconducting to cause an increase in potential to be impressed over lead 97 to again operate the current amplifiers 98 and 99 and a marking condition is thereafter applied on the lead 104 which condition is representative of the first intelligence impulse of the signal to be transmitted.

Inasmuch as the potential on lead 26 is at a very low value the operation of the tube 34 is ineffective to operate the gating circuit associated with the junction point 28*b* and as a result thereof the potential on lead 54 drops. This drop in potential causes the tube 107 to be rendered nonconducting whereupon the resulting increased anode potential is impressed over the lead 152, through the switch 11, through the differentiating capacitance 109 and the diode 110 to drive the suppressor 111 in a positive direction. The appearance of a positive potential on the suppressor releases the phantastron 113 for a single cycle of operation. Upon completion of this cycle of operation the tube 128 is rendered conducting to cause a decreased potential to be impressed through the differentiating condenser 129, the diode 131 and through the switch 12, over a lead 153, over the lead 93 to render the tube 94 nonconducting. Immediately thereupon tube 96 is again rendered conducting to cause a decrease in potential to be applied over lead 97 to shut off the current amplifiers 98 and 99. Again the line relay 102 will be deenergized to permit the contact 103 to open and thereby impress a spacing condition on the lead 104. It may be thus understood that the duration of the marking condition impressed on line 104 is determined by the period of operation of the phantastron 113.

Figure 8:
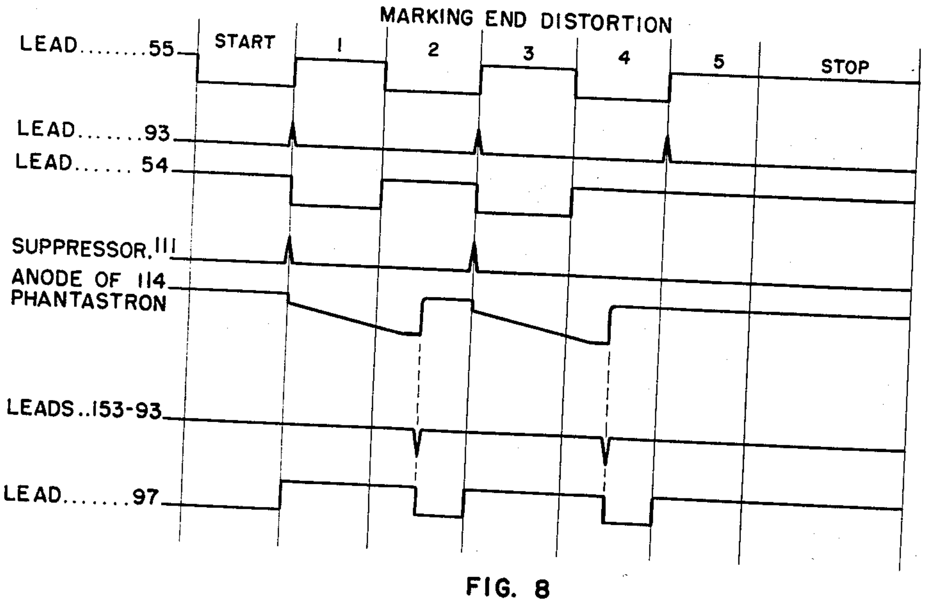

Referring to Fig. 8 potential conditions on the various components during the generation of signals having marking end distortion are shown. In this instance it will be noted that each time a space to mark condition occurs on the lead 55 a positive going pulse is applied over lead 93 to the tube 94 of the binary. This results in an operation of the binary and an increased potential is applied to the lead 97 to cause a marking condition to be impressed on the output line 104. Whenever there occurs a mark to space transition on the lead 54, a positive going impulse is impressed through the diode 110 to drive the suppressor 111 positive and thereby release the phantastron 113 for a cycle of operation. When the potential on the anode 114 rises following a completion of the operation of the phantastron 113, the tube 128 is again operated to impress a decreased potential condition through the differentiating capacitor 129 whereupon a negative going pulse is produced and impressed through the diode 131, through the switch 12 and over the leads 153 and 93 to the grid of the tube 94. As previously discussed, tube 94 shuts off and tube 96 comes on to again render the current amplifiers 98 and 99 nonconductive to thereby cause the line relay 102 to release the contact 103 and thus apply a spacing condition on the line 104. It may be appreciated that the duration of each marking impulse is now determined by the period of rundown of the phantastron 113. As the resistance 134 is adjusted to decrease the resistance of the circuit running to the anode 114 then the phantastron will execute a cycle of operation in a shorter time and as a result thereof each subsequently generated marking impulse will have less marking end distortion.

In order to generate signals having spacing end distortion it is only necessary to move the switch 15 from the M position to the S position. The net result of this is to increase the resistance connected in the circuit running to the anode 114 and thus reduce the initial or net value of the potential impressed on the anode. The phantastron will now execute a much shorter cycle of operation consequently terminating each marking impulse impressed on the line 104 at a time which is much shorter than a normal marking signal impulse.

Figure 9:
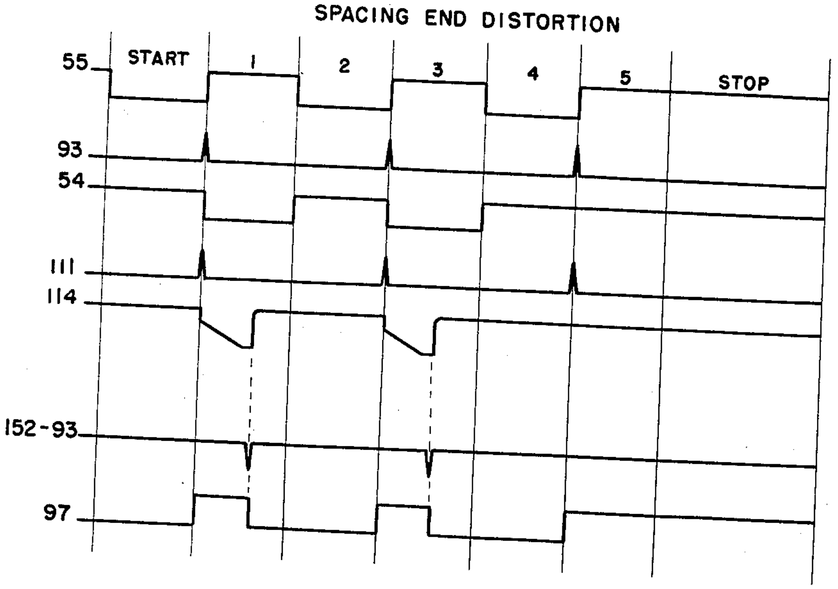

The potential existing on various critical elements during the generation of signals having spacing end distortion is shown in Fig. 9. Again it is to be noted that each time a space to mark transition occurs on lead 55 a marking condition is initially impressed on lead 97 and the output lead 104. Each time a space to mark transition occurs on the lead 54, the phantastron 113 is initiated into a cycle of operation. Upon completion of each cycle of operation of the phantastron the anode potential of tube 128 drops to impress a negative potential on the lead 93 causing the tube 94 to shut off and the tube 96 to come on. The result of this operation is that the current amplifiers 98 and 99 are again shut off to cause the line relay 102 to release the contact 103 and a spacing condition is again impressed on the output line 104.

In order to forestall operation of the phantastron during the impression of a stop impulse on the output line 104 the contact 10 is connected to the source of positive battery, thereby maintaining the tube 107 in a conductive state. With tube 107 conducting its anode potential is held at a low value and is thus precluded from applying a positive pulse over the lead 152 to release the phantastron 113.

In order to generate a perfect signal with no distortion whatsoever it is only necessary to move the switches 10, 11, 12 and 14 to the center position. With this setting the phantastron 113 is disconnected and there are no diodes such as diodes 92 and 151 (Fig. 3), isolating the binary 94—96 from the amplifier tube 89. It will be remembered that the tube 89 is operated in accordance with the signal conditions to be transmitted, hence the binary will be directly controlled by this tube to cause true signals to be impressed on the output line 104.

Another feature of the invention resides in a lead 156 running from a connection between resistances 134 and 136 (Fig. 3) and the anode 67 of the phantastron 56 (Fig. 1) which provides a rest or initial potential bias for the anode 67 that is always proportional to the rest or initial potential bias on the anode 114 of phantastron 113. If it is desired to change the speed of the signal generator, it is only necessary to adjust the resistance 139. When the resistance 139 is increased there will be a proportional decrease in the rundown times of both the phantastron 56 and the phantastron 113 and the speed of signal generation will increase. Conversely if the resistance 139 is decreased the period of operation of both phantastrons is increased to decrease the speed of signal operation.

It is to be understood that the above-described arrangements of components and construction of elemental parts are simply illustrative of an application of the principles of the invention and many other modifications may be made without departing from the invention.

What is claimed is:

1. In a signal generator, a binary circuit means for controlling the output signal conditions impressed on a transmission line, signal originating means for producing two potential conditions indicative of the signals to be transmitted, means responsive to a first of said potential conditions for actuating the binary circuit in a first condition, a start-stop oscillator, means responsive to a second of said potential conditions for operating the oscillator, means actuated by the oscillator for actuating the binary circuit in a second condition.

2. In a signal generator as defined in claim 1 having means for varying the speed of operation of the oscillator to vary the time that said binary circuit is maintained in said second condition.

3. In a distortion signal generator, a binary circuit for impressing signal impulse conditions on a transmission line, a series of gating circuits, means for conditioning the gating circuits in accordance with marking and spacing conditions indicative of the signal impulses to be impressed on the transmission line, means for sequentially operating said gating circuits to accordingly operate said binary circuit, a delay circuit, means actuated by the gating circuits for operating said delay circuit, means actuated by the operation of said delay circuit for determining the time that the binary circuit is actuated to impress a marking condition on the transmission line, and switching means for changing the period of delay of said delay circuit to change the type of distortion introduced into each signal.

4. In a signal generator, a binary circuit means for controlling the signal conditions impressed on a transmission line, signal originating means for producing potential conditions representative of the signals to be impressed on said transmission line, means responsive to potential conditions of a first predetermined character for actuating said binary circuit to impress a marking condition on said transmission line, a start-stop oscillator, means responsive to a potential condition of a second predetermined character for actuating said oscillator through a single cycle of operation, means actuated by said oscillator for actuating said binary means to impress a spacing condition on said transmission line, and switching means for causing said oscillator actuated means to operate the binary circuit means to impress a marking condition on said transmission line and said other binary actuating means to operate the binary circuit means to impress a spacing condition on said transmission line.

5. In a signal generator, a binary circuit means for impressing signal conditions on a transmission line, a source of signals for producing potential conditions indicative of the signals to be impressed on said transmission line, means responsive to a first predetermined signal potential condition for actuating the binary circuit means to impress a first signal condition on the transmission line, a phantastron oscillator having an anode resistance circuit for determining the period of operation thereof, means responsive to a second predetermined signal condition for actuating the phantastron through a single cycle of operation, means actuated by said phantastron oscillator for actuating said binary circuit means to impress a second signal condition on the transmission line, and means for varying the anode resistance circuit to vary the time that the second signal condition is impressed on said transmission line.

6. In a distortion signal generator, a control circuit for applying either of two signal conditions on a transmission line, signal originating means for producing potential conditions indicative of the signal to be transmitted, means responsive to a first potential condition for operating said control circuit to impress a first signal condition on the transmission line, an oscillator circuit, means responsive to a second potential condition for releasing the oscillator for a single cycle of operation, means actuated by the completion of a cycle of operation of the oscillator for actuating the control circuit to impress a second signal condition on the output line, and means for varying the period of operation of the oscillator to introduce distortion into the signals impressed on the transmission line.

7. In a distortion signal generator, a binary circuit controlled means for impressing signal conditions on an output line, signal originating means, a multi-stage distributor, an oscillator, means for driving the distributor, means responsive to said distributor and said signal originating means in a first condition for actuating said binary means to impart a first signal condition on said output line, means responsive to said distributor and signal originating means in a second condition for operating said oscillator, and means actuated by the completion of a cycle of said oscillator for actuating said binary means to impart a second signal condition on said output line.

8. In a signal generator, a distributor having a number of stages equal to the number of impulses in a signal to be generated, a pair of gating circuits associated with each stage of the distributor, means to condition a first of each pair of gating circuits in accordance with the marking and spacing signal impulses to be generated, means for conditioning each of the second gating circuits in accordance with the signal condition impressed on the next succeeding first gating circuit, means connecting each stage of distributor to each pair of gating circuits for successively operating said pairs of gating circuits in accordance with the signal conditions impressed thereon, a first control lead connected to all said first gating circuits, a second control lead connected to all said second gating circuits, an output lead, means controlled by a transition from a marking to spacing condition on said first control lead for applying a spacing condition on said output lead, and delayed operating means controlled by a transition from a spacing to a marking condition on said second control lead for applying a marking condition on said output lead.

9. In a signal generator, a distributor having a number of stages equal to the number of impulses in a signal to be generated, a pair of gating circuits associated with each stage of the distributor, means to condition a first of each pair of gating circuits in accordance with the marking and spacing signal impulses to be generated, means for conditioning each second gating circuit in accordance with the signal condition impressed on the next succeeding first gating circuit, means connecting each stage of the distributor to each pair of gating circuits for successively operating said pairs of gating circuits in accordance with the signal conditions impressed thereon, a first control lead connected to all said first gating circuits, a second control lead connected to all said second gating circuits, an output lead, means controlled by a transition from a spacing to a marking potential condition on said first control lead for applying a marking potential condition on said output lead, and delayed operating means controlled by a transition from a marking to a spacing potential condition on said second control lead for applying a spacing condition on said output lead.

10. In a signal generator for generating signals having a bias type distortion, means for impressing signal conditions on an output line, a binary circuit for controlling said signal impressing means, means for originating potential conditions indicative of the signal to be transmitted, a start-stop multistage distributor, an oscillator, means responsive to the successive operation of the stages of the distributor and a predetermined potential condition of said signal originating means for successively setting said binary circuit in a first condition to cause said signal impressing means to impress a spacing condition on said output line, means responsive to the successive operation of said stages of said distributor and other predetermined potential conditions of said signal originating means for successively operating said oscillator, and means actuated by each completion of a cycle of operation of said oscillator for setting said binary circuit in a second condition to cause said signal impressing means to impress a marking condition on said output line.

11. In a signal generator for generating signals having end distortion, means for impressing signal conditions on an output line, a binary circuit for controlling said signal impressing means, signal originating means for producing potential conditions indicative of each signal to be transmitted, a start-stop multistage distributor, an oscillator, means responsive to successive operation of said distributor and the signal originating means for producing a first potential condition for operating said binary circuit into a first setting to cause said impressing means to impress a marking condition on said output line, means responsive to said successive operation of said distributor and the signal originating means producing a second potential condition for operating said oscillator, and means operated by the oscillator completing said cycle of operation for operating said binary circuit into a second setting to cause said impressing means to impress a spacing condition on said output line.

12. In a distortion signal generator, a control means for impressing signal impulse conditions on a transmission line, a series of gating means, means for conditioning each gating means with marking and spacing potentials indicative of both the signal impulse to be transmitted and the next succeeding signal impulse to be transmitted, a distributor means for successively operating each conditioned gating means having a marking potential applied thereto, means actuated by a gating means having a spacing potential applied thereto to be transmitted for actuating said control means to apply a spacing condition on said transmission line, a time delay circuit, means actuated by the operation of a gating means conditioned by a marking signal potential next to be transmitted for operating said time delay circuit, and means generated by the completion of the operation of said time delay circuit for operating said control means to impress a marking condition on said transmission line.

13. In a distortion signal generator, a control means for impressing signal conditions on a transmission line, a series of gating means, means for conditioning each gating means with marking and spacing potentials indicative of both the signal impulse to be transmitted and the next succeeding signal impulse to be transmitted, a distributor means for successively operating each conditioned gating means having a marking potential applied thereto, means actuated by a gating means having applied thereto marking potential to be transmitted for actuating said control means to impress a marking condition on the transmission line, a time delay circuit, means actuated by the operation of a gating means conditioned by a spacing impulse next to be transmitted for operating said time delay circuit, and means operated by the completion of the operation of said time delay circuit for operating said control means to impress a spacing condition on said transmission line.

14. In a signal generator, a binary circuit means for controlling the impression of signal conditions on an output line, a first series of gating means, a second series of gating means, a multistage distributor having each stage associated with a gating means in both said first and second gating means, means for conditioning said first gating means with marking and spacing potential conditions indicative of the signal impulses then to be successively transmitted, means for conditioning said second gating circuits with the same potential conditions but indicative of the impulses next to be transmitted, means for driving the distributor for successively operating the gating circuits, a start-stop oscillator, means actuated by the operation of a second gating means having a marking condition impressed thereon for operating said oscillator, means actuated by the oscillator for operating said binary means to impress a marking condition on said transmission line, and means operated by a first gating means having a spacing condition applied thereto and the operation of its corresponding stage in the distributor for actuating said binary circuit means to impress a spacing condition on said transmission line.

15. In a signal generator, a binary circuit means for controlling the impression of signal conditions on a transmission line, a first series of gating means, a second series of gating means, a multistage distributor having each stage adapted to condition one gating means in each series of gating means, means for conditioning the first series of gating means in accordance with the marking and spacing signal impulse conditions to be transmitted, means for conditioning the second series of gating circuits with the marking and spacing signal impulse conditions next to be transmitted, means for driving the distributor to successively operate the first gating means to actuate the binary circuit means to impress marking conditions on the output line whenever said first series of gating means has a marking condition impressed thereon, a start-stop oscillator, means actuated by a marking condition on said second gating means and the operation of the associated stage of the distributor for operating said oscillator, and means actuated by said oscillator following a period of operation thereof for actuating said binary means to impress a spacing condition on said transmission line.

16. In a signal generator, a binary controlled circuit means for impressing marking and spacing conditions on a transmission line, a multistage distributor, a pair of gating circuits associated with each stage of the distributor, means for conditioning a first gating circuit of each pair with potential conditions indicative of the marking and spacing signal impulses to be transmitted, means for conditioning the second gating circuit of each pair with potential conditions indicative of the next signal impulses to be transmitted, means for driving the distributor to successively operate each stage and its associated gating circuit, a start-stop oscillator, a pair of electronic control means for operating said oscillator, means interconnecting the first gating circuit of each pair and the electronic control means for actuating said oscillator when said gating circuit is conditioned by marking potential, means controlled by said oscillator for operating said binary controlled circuit to impress a marking condition on said transmission line, means interconnecting said second gating circuit of each pair and said binary controlled circuits for operating the binary control circuit when said gating circuit is conditioned by spacing potential to impress a spacing condition on said transmission line, and switching means for rendering one of said electronic means ineffective so that operation of the oscillator operates said binary controlled circuit to impress a spacing condition on said transmission line and operation of said first gating circuits operates the binary controlled circuit means to impress a marking condition on said transmission line.

17. In a signal generator, a first oscillator for determining the speed at which signal impulses are generated, a second oscillator for determining the duration of said signal impulses, and means for simultaneously varying the rate of operation of said oscillators to maintain the proportion between the rate and duration that the signals are generated.

18. In a distortion signal generator, means for impressing marking and spacing signal impulses on a transmission line, a first oscillator means for determining the speed at which said marking impulses are impressed on said line, a second oscillator means for controlling the duration of said marking impulses, and means for simultaneously varying the rate of operation of said oscillator to hold constant the percent of duration of marking impulses with respect to the duration of the spacing impulses.

19. In a signal generator, a first phantastron oscillator for determining the speed at which signals are generated, means for setting the anode potential of said phantastron oscillator at predetermined value to cause said phantastron to operate at predetermined rate, a second phantastron oscillator for determining the duration of each signal impulse, means for setting the anode potential of said second phantastron oscillator at a predetermined value to cause said phantastron to operate at a predetermined rate, and means for simultaneously varying said anode potentials to cause said phantastron oscillators to operate in direct proportional rates.

20. In a distortion signal generator, a binary control circuit for impressing marking and spacing signal conditions on a transmission line, a series of gating circuits, means for conditioning said gating circuits with potential conditions indicative of the signal to be impressed on the transmission line, an oscillator for driving said distributor to actuate said gating circuits, means operated by the gating circuits for operating said binary control circuit, a second oscillator, means operated by said gating circuit for operating said second oscillator, means actuated by the second oscillator for operating said binary circuit to introduce distortion into each marking signal condition impressed on said transmission line, and means for simultaneously varying the period of operation of said oscillators to vary the speed at which signals are impressed on the transmission line without varying the percent of distortion introduced into each signal.

21. In a signal generator, a binary control circuit for applying marking and spacing signal impulse conditions on an output line, a plurality of gating circuits conditioned for operation in accordance with the signal impulses to be applied to the transmission circuit, a multistage distributor having one stage indicative of a stop marking signal condition for successively operating said gating circuits, means actuated by said gating circuits for operating said binary circuit to apply marking impulses on said line, a delay circuit, means operated by said gating circuits for operating said delay circuit, means operated by said delay circuit for operating said binary circuit to apply a spacing condition on said line, and means controlled by the stop stage of the distributor for operating said binary circuit to apply a spacing condition on said line.

References Cited in the file of this patent

UNITED STATES PATENTS

| | | |
|---|---|---|
| 2,440,547 | Jensen | Apr. 27, 1948 |
| 2,568,019 | Martin | Sept. 18, 1951 |
| 2,644,037 | Beaufoy | June 30, 1953 |